INVENTOR
PERCY NORMAN EVANS

INVENTOR
PERCY NORMAN EVANS

BY Harre and Nydrick

ATTORNEYS

July 24, 1962  P. N. EVANS  3,045,836
CRANES AND THE LIKE

Filed Sept. 29, 1958  3 Sheets-Sheet 3

INVENTOR
PERCY NORMAN EVANS

BY Hause and Nydick

ATTORNEYS

United States Patent Office 3,045,836
Patented July 24, 1962

3,045,836
CRANES AND THE LIKE
Percy Norman Evans, Pangbourne, England, assignor to British Hoist and Crane Company Limited, Compton, England
Filed Sept. 29, 1958, Ser. No. 764,113
Claims priority, application Great Britain Sept. 27, 1957
11 Claims. (Cl. 212—35)

This invention relates to cranes and like appliances for handling goods, and is particularly applicable to mobile appliances. The invention has for its object to provide an improved device of this kind, in which the jib or corresponding load carrying member has a degree of slewability.

In carrying the invention into effect, in particular on a mobile appliance, a jib or like load carrying member is provided which is pivotally mounted so as to have freedom of movement in the vertical plane, and at least a limited degree of movement in the horizontal plane. The support and movement of the jib or the like in both these directions is effected by means of extensible members, preferably hydraulic rams, in a manner which will appear more particularly hereinafter.

These and other features of the invention will appear from the following description of one embodiment thereof, given by way of example, in conjunction with the accompanying drawings in which.

Figure 1:
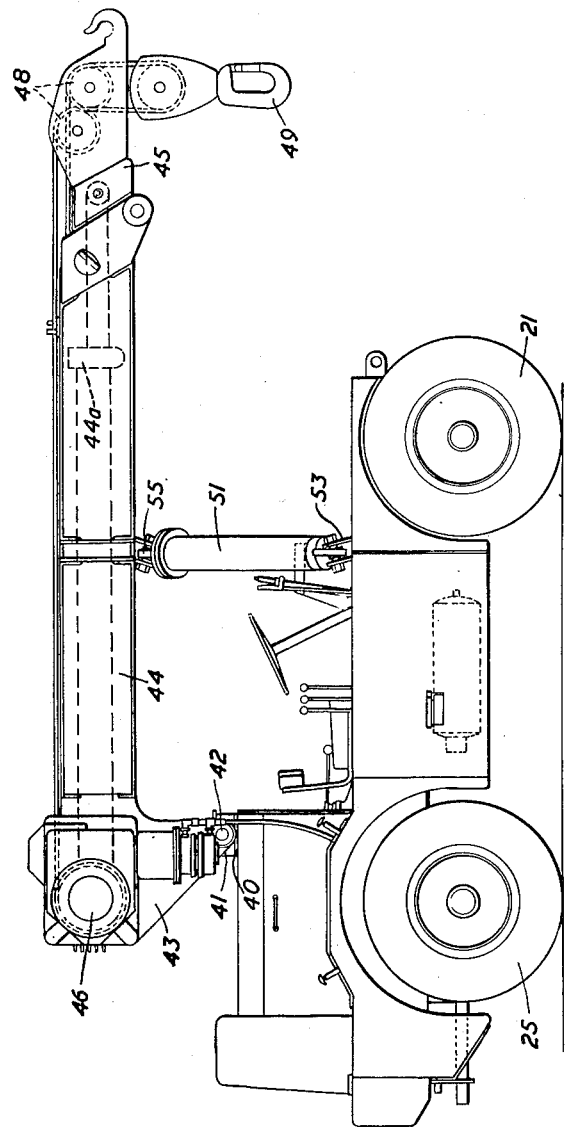
FIGURE 1 is a side elevational view, partly simplified, of a mobile crane in accordance with the invention.

The crane which is shown in these drawings comprises a strong rigid chassis fabricated from steel channel and box members. The construction of this chassis will depend upon the service for which the crane is intended, and can be varied accordingly, but as shown includes longitudinal members 10, 11 and 12, 13, with cross members 14 and 15. Upon this chassis is secured sheet metal cladding, of which some is indicated at 16, 17 and flooring 18. Most of the flooring, for clarity, is not shown in FIGURE 4.

The crane has fixed, twin front wheels 20, 21, mounted on an axle assembly 22; the wheels are driven, and are coupled through a differential gear housed in casing 23. The rear wheels 24, 25 are mounted on axle 26 and are steerable by means of a steering gear indicated generally at 27, and steering wheel 28. For achieving a high degree of maneuverability, the rear wheels can be steered through a wide angle the limits for wheel 24 being indicated by the broken lines 24a.

An internal combustion engine 30 is mounted at the rear of the chassis, with radiator 31; the engine is coupled to the road wheels 20, 21 through clutch 32, gear box 33, with control arm 34, and universal shaft 35 and differential gear 23. The engine is also coupled through a take-off box 36 and universal shaft 37 to an hydraulic pump 38.

As thus far described, there is provided a strong, powerfully driven, steerable chassis, and an hydraulic power supply, and on this base is mounted the crane structure proper.

On a cross member 40 on the chassis is mounted a jib bearing member 41, to which is pivoted at 42 the lower part of a jib structure 43. The bearing is such that the jib structure can pivot both in the vertical plane, and in the horizontal plane, to a limited degree. As will appear hereinafter, the extent of movement in these two planes is about 45°.

The jib structure 43 is of box section at 44, within which is a further part 45, also of box section, which can telescope within the part 44, under the control of an hydraulic cylinder, but disposed within the part 44. This cylinder is indicated at 44a in broken lines, and is fed from the same source of hydraulic fluid as are the cylinders to be mentioned later, which are used for slewing and luffing. If desired, the jib part 45 can have a further extension to increase its length, manually operable.

The jib structure carries at its rear end an hydraulic winch 46, from which a steel wire rope 47 passes over guide pulleys 48 to a load hook 49.

To support the jib structure, two hydraulic cylinders 50 and 51 are secured each at their one end 52, 53 to a chassis whilst the rams of the cylinders are secured at 54, 55 to a point on the jib structure. The connections at points 52 to 55 are all made by points which, within a limited range of movement, are universal.

A connection is made from the hydraulic pump through control valve 56 to the hydraulic cylinder 50, and from the pump, through control valve 57, to cylinder 51.

Figure 2:
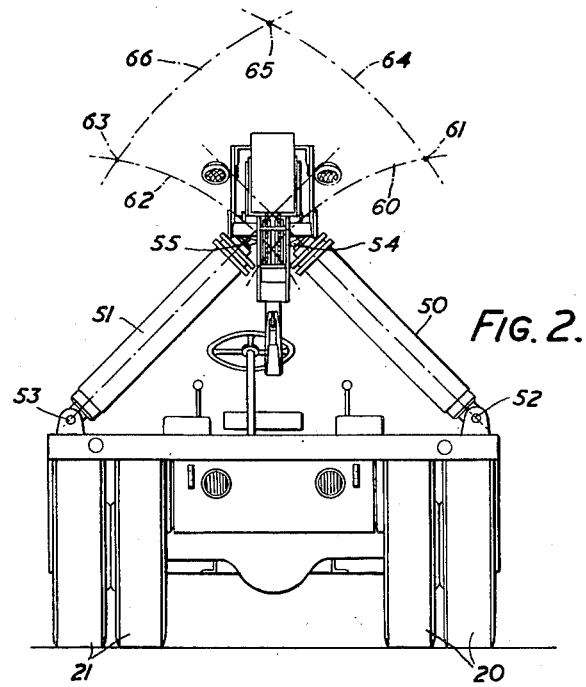
FIGURE 2 is a front elevational view of the same crane.
Figure 3:
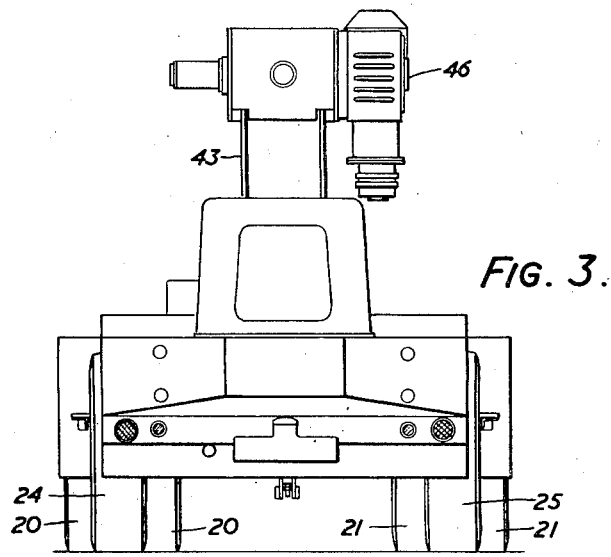
FIGURE 3 is a rear elevational view of the crane.

As will be seen clearly from FIGURE 2, the two cylinders 50, 51 are inclined towards each other at an angle of about 45° to the vertical. If with the parts in this position valve 57 is operated to admit hydraulic fluid to 51, the ram of the cylinder will be forced out, causing the pivot point 54 to follow an arcuate path, centred on the pivot 52, this path being indicated by the line 60 in FIGURE 2. This path is limited, by the maximum stroke of the ram, to the point 61.

On the other hand, if fluid is admitted first to cylinder 50, the jib pivot 55 will follow a path indicated by line 62 with a limit at point 63.

It will readily be seen that if, with the ram of cylinder 51 fully extended and pivot 54 at point 61, fluid is admitted to cylinder 50 then pivot 54 will follow an arcuate path 64, centered on pivot 53. The limit of this path is point 65, which corresponds to both rams being fully extended. If fluid is released from cylinder 51, pivot 55 will follow path 66 back to point 63.

The control valves 56, 57 permit the rams of the cylinders to be held at any point of extension, so that the jib can be moved to any point within the area bounded by the lines 60, 64, 62, 66. In practice, raising the jib to the point 65 produces about a 45° elevation of the jib from the lowest, and roughly horizontal position.

Figure 4:
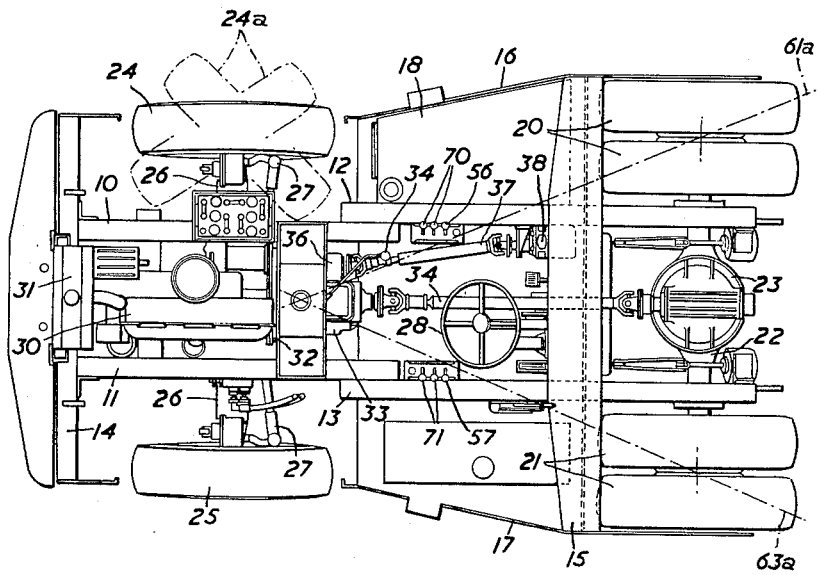
FIGURE 4 is a plan view of the crane with some of the cladding omitted for clarity, and omitting also the jib structure.

Movement between points 61 and 63 corresponds to a slewing movement of about 45°. The limits of the slewing movement are shown in FIGURE 4, by lines 61a and 63a, corresponding to points 61 and 63 respectively. It will be seen that lines 61a and 63a pass vertically over the road wheels 20 and 21; this ensures that no dangerous lateral overturning movement can be imposed on the crane by excessive slewing, giving the crane a high degree of safety in this respect. The operator can thus, by valves 56 and 57, have complete control of the luffing and slewing of the crane. Obviously, in use, the movement of the jib as described can be supplemented by movements of the crane as a whole on its road wheels.

By means of further control valves such as 70, 71, the supply of hydraulic fluid to the winch and the jib extension cylinder are controlled.

The embodiment of the invention described provides a crane which for a given facility is particularly simple in construction. The limited requirements of the pivot 41 enable this pivot to be made with a far less massive construction than is required with a full slewing crane, and the simplicity of attachment of the cylinders and their rams to the chassis and the underside of the jib, by simple universal joints, also adds substantially to the durability obtained with the crane described.

I claim:

1. A crane structure comprising a support, a jib pivotally mounted on said support for slewing and luffing movement, and two independently operable hydraulic cylinder devices each of which is attached to said support and to said jib at a point between the ends of said jib, said hydraulic cylinder devices being attached to the same point on said jib, and effecting luffing and slewing thereof said hydraulic cylinder devices at minimum extension being substantially equally inclined to a plane which includes the axis about which said slewing movement occurs.

2. A crane structure according to claim 1, wherein said jib is pivotally-mounted for slewing and luffing movement at the uppermost part of a pillar-shaped structure such that when said hydraulic cylinder devices are at minimum extension said jib is substantially horizontal, and wherein said cylinder devices are so mounted that, throughout any extension thereof, they both remain substantially in the same plane.

3. A crane structure as claimed in claim 2, wherein said jib comprises two telescopic members and a further hydraulic cylinder device for extending said members, said first-named cylinder devices being attached to said jib at a point thereon which remains substantially stationary when said jib is extended.

4. A crane structure comprising a support, a jib pivotally mounted on said support for slewing and luffing movement, which jib includes first and second telescopic members and means for moving said second telescopic member with respect to said first telescopic member for extending said jib, and two hydraulic cylinder devices each of which is attached to said support and to said first telescopic member at a point intermediate the ends thereof, said first telescopic member remaining stationary on extension of said jib, said two hydraulic cylinder devices both being attached to said first telescopic member at the same point and effecting luffing and slewing of the jib, and said two hydraulic cylinder devices at minimum extension being substantially equally inclined to a plane which includes the axis about which said slewing movement occurs.

5. A crane structure according to claim 4, wherein said support is generally rectangular, said jib being pivotally mounted thereon near one end of said support with the jib extending towards the other end of said support, and wherein a means is provided to limit the extent of slewing movement so that in each slewing position said jib is above the peripheral outline of said other end of said support.

6. A crane structure according to claim 4, wherein each of said telescopic members is a channel-form girder structure, and wherein said means for moving said second telescopic member to effect said extension is a hydraulic cylinder mounted within said first telescopic member.

7. A mobile crane, which comprises a chassis which has a plurality of road wheels and a prime mover for driving said wheels, a jib mounted for slewing and luffing movement on said chassis at a point near one end thereof with said jib extending towards the other end thereof, and two independently operable hydraulic cylinder devices each of which is attached to said chassis and to said jib at a point intermediate the ends thereof, said hydraulic cylinder devices both being attached to the same point on said jib and effecting luffing and slewing thereof, said hydraulic cylinder devices at minimum extension being substantially equally inclined to a plane which includes the axis about which said slewing movement occurs.

8. A mobile crane according to claim 7, wherein said chassis is of generally rectangular shape with the jib mounted near to one end of said chassis and extending towards the other end thereof, and wherein a means limits the angular extent of said slewing movement so that said jib remains in each slewing position above the peripheral outline of said other end of the chassis.

9. A mobile crane as claimed in claim 7, wherein said jib comprises first and second telescopic members, and means for moving said second telescopic member with respect to said first telescopic member to extend said jib, said hydraulic cylinder devices being attached to a point between the ends of said first telescopic member, which remains stationary when the jib is extended.

10. A mobile crane as claimed in claim 9, wherein said telescopic members are channel-form girder members, and wherein said means for moving said second telescopic member is a further hydraulic cylinder device mounted within said first telescopic member.

11. A mobile crane comprising a chassis which has a plurality of road wheels and a prime mover for driving said wheels, a pillar-like structure at a point near to one end of said chassis, a jib mounted for luffing and slewing on said pillar-like structure and extending towards the other end of said chassis, said jib including first and second telescopic members and having means for moving said second telescopic member with respect to said first telescopic member to extend said jib, said first telescopic member remaining stationary on extension of said jib; two independently-operable hydraulic cylinder devices each of which is attached to said chassis and to said jib, said hydraulic cylinder devices being both attached to the first of said telescopic members at the same point, which point is located intermediate the ends of said first telescopic member, said hydraulic cylinder devices being so disposed between said chassis and said jib that at minimum extension they are substantially equally inclined to a plane which includes the axis about which said slewing movement occurs and that at minimum extension said jib is substantially horizontal, and said hydraulic cylinder devices effecting said luffing and slewing; and being the only means which effect said luffing and slewing; and means provided to limit the extent of said slewing movement such that in each slewing position said jib is above the peripheral outline of the chassis and the road wheels at each other end of the chassis.

References Cited in the file of this patent

UNITED STATES PATENTS

| | | |
|---|---|---|
| 2,462,926 | Wilson | Mar. 1, 1949 |
| 2,601,927 | Frenzel | July 1, 1952 |
| 2,639,048 | Glashaw | May 19, 1953 |
| 2,787,383 | Antos | Apr. 2, 1957 |
| 2,829,787 | Kalaus | Apr. 8, 1958 |
| 2,911,111 | Grove | Nov. 3, 1959 |
| 2,951,596 | Winder | Sept. 6, 1960 |